INVENTOR.
NATHAN L. ZUTTY

United States Patent Office 3,287,327
Patented Nov. 22, 1966

3,287,327
COPOLYMERS OF BICYCLO[2.2.1]HEPTA-2,5-DIENE
Nathan L. Zutty, Charleston, W. Va., assignor to Union Carbide Corporation, a corporation of New York
Filed July 27, 1961, Ser. No. 127,292
29 Claims. (Cl. 260—78.5)

This invention is concerned with novel polymeric compositions and to processes for their production. More particularly, this invention relates to copolymers containing polymerized bicyclo[2.2.1]hepta-2,5-diene and to a process for producing them.

Bicyclo[2.2.1]hepta-2,5-diene, hereinafter referred to as bicycloheptadiene, has the structural formula:

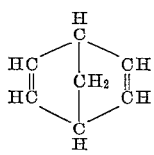

Bicycloheptadiene is known to polymerize to low molecular weight homopolymers whose infrared spectra have absorption bands at $6.35\mu$, $12.4\mu$, and $14.1\mu$. These bands indicate that the bicycloheptadiene homopolymers heretofore known contain two different groups; namely, the nortricyclene group, which is represented by the structural formula:

(I)
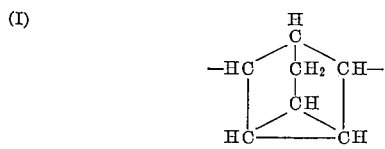

and which is evidenced by a strong absorption band at $12.4\mu$, and a bicyclic group containing a cis-strained carbon-carbon double bond, which is represented by the structural formula:

(II)
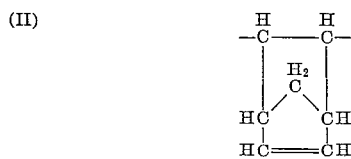

which is evidenced by a weak absorption band at $6.35\mu$, representing a strained ring containing a carbon-carbon double bond, and a strong absorption band at $14.1\mu$, representing a cis internal carbon-carbon double bond structure.

It is also known that bicycloheptadiene will copolymerize with aliphatic olefinic hydrocarbon compounds, such as ethylene, propylene, butene-1, butene-2, isobutylene, and the like, and cyclo-olefinic hydrocarbons, such as cyclopentene, cyclohexene, cycloheptene, and the like, wherein the polymerized bicycloheptadiene is present in the polymer chain in both the bicyclic and nortricyclene forms.

It has now been discovered that bicycloheptadiene will copolymerize with compounds containing a polymerizable ethylenic double bond, >C=C<, said compounds containing atoms other than carbon and hydrogen. It was also unexpectedly and surprisingly found that substantially all of the bicycloheptadiene copolymerized in these copolymers as the nortricyclene group, group (I) above, as evidenced in the infrared spectra characterization of such copolymers by a strong absorption band at $12.4\mu$, and the essential absence of absorption bands due to olefinic unsaturation at $6.35\mu$ and $14.1\mu$.

Figure 1:
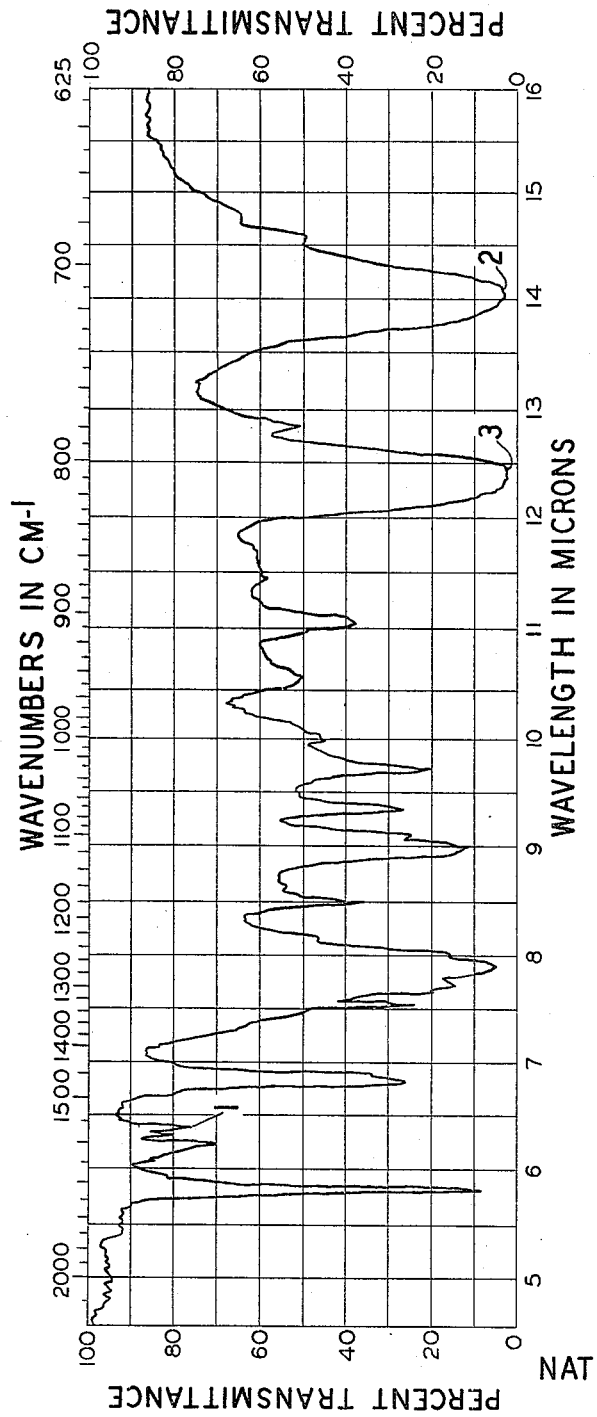
FIG. 1 is a typical infrared transmission spectrum for poly(bicycloheptadiene) produced by homopolymerization of bicycloheptadiene in the presence of a free-radical catalyst.

With reference to FIG. 1, the presence of the bicyclic group (II) in poly(bicycloheptadiene) is indicated by absorption band 1 at $6.35\mu$, and absorption band 2 at $14.1\mu$. The presence of the nortricyclene group (I) is indicated by absorption band 3 at $12.4\mu$.

Figure 2:
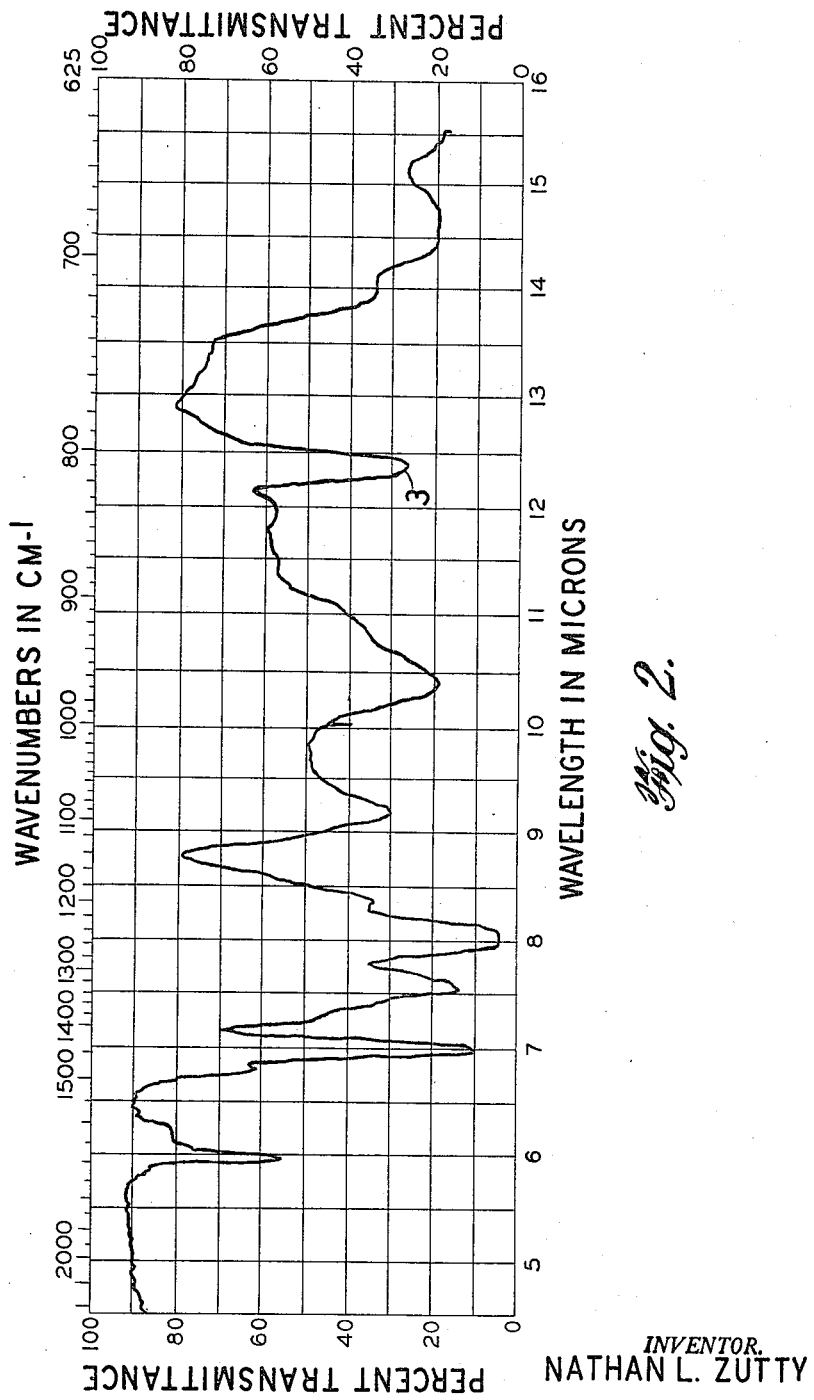
FIG. 2 is an infrared transmission spectrum of a copolymer having 12.8 weight percent polymerized bicycloheptadiene and 87.2 weight percent polymerized vinyl chloride, representative of the infrared spectra of the copolymers of this invention.

With reference to FIG. 2, representative of the infrared spectra of the copolymers of this invention, it can be seen that absorption bands at $6.35\mu$ and $14.1\mu$ due to olefinic unsaturation are essentially absent, the broad absorption band at the higher wavelengths being due to polymerized vinyl chloride, while there is a pronounced absorption band 3 at $12.4\mu$, indicating that substantially all of the bicycloheptadiene copolymerized as the nortricyclene group (I).

The copolymers of this invention are produced by copolymerizing bicycloheptadiene with a polymerizable, ethylenically unsaturated compound, as hereinafter defined, in the presence of a free-radical catalyst.

The polymerizable, ethylenically unsaturated compounds which can be copolymerized with bicycloheptadiene to give the copolymers of this invention can be represented by the following generic formula:

(A)

wherein X can be a hydrogen atom or a halogen atom, such as fluorine, chlorine, bromine, or iodine; $X^1$ can be a hydrogen atom, a halogen atom as defined above, or a carbalkoxy radical having from 1 to about 5 carbon atoms in the alkoxy radical thereof, such as the carbomethoxy radical, the carbethoxy radical, the carbisopropoxy radical, and the like; $X^2$ can be a hydrogen atom, a halogen atom as defined above, a methyl radical, or a cyano radical; and $X^3$ can be a halogen atom as defined above, a carbalkoxy radical as defined above, a saturated aliphatic acyloxy radical having from 1 to about 5 carbon atoms in the alkyl radical thereof, such as the acetoxy radical, the propionoxy radical, and the like, or a cyano radical.

As will be seen, the polymerizable, ethylenically unsaturated compounds which can be copolymerized with bicycloheptadiene can be vinyl-type compounds, vinylidene-type compounds, vinylene-type compounds, and tetrahalogenated ethylenes.

The vinyl-type compounds that can be copolymerized with bicycloheptadiene can be represented by the subgeneric formula:

(B) 

wherein R can be a halogen atom, a carbalkoxy radical having from 1 to about 5 carbon atoms in the alkoxy radical thereof, a saturated aliphatic acyloxy radical having from 1 to about 5 carbon atoms in the alkyl radical thereof, or the cyano radical. As examples of such vinyl-type compounds which can be copolymerized with bicycloheptadiene one can mention vinyl chloride, vinyl fluoride, methyl acrylate, ethyl acrylate, propyl acrylate, vinyl acetate, vinyl propionate, acrylonitrile, and the like.

The vinylidene-type compounds that can be copolymerized with bicycloheptadiene can be represented by the following subgeneric formula:

(C) 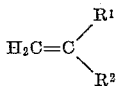

wherein $R^1$ can be a halogen atom, a cyano radical, or a methyl radical; and $R^2$ can be a halogen atom, a cyano radical, or a carbalkoxy radical having from 1 to about 5 carbon atoms in the alkoxy radical thereof. As examples of vinylidene-type compounds which can be copolymerized with bicycloheptadiene, one can mention vinylidene chloride, vinylidene fluoride, vinylidene cyanide, methacrylonitrile, methyl methacrylate, chloroacrylonitrile, ethyl chloroacrylate, and the like.

The vinylene-type compounds that can be copolymerized with bicycloheptadiene can be represented by the following subgeneric formula:

(D) $R^3CH=CHR^3$ wherein $R^3$ is a carbalkoxy radical having from 1 to about 5 carbon atoms in the alkoxy radical thereof. As examples of the vinylene-type compounds that can be copolymerized with bicycloheptadiene one can mention dimethyl fumarate, diisopropyl fumarate, diisobutyl fumarate, and the like.

The tetrahalogenated ethylenes that can be copolymerized with bicycloheptadiene can be represented by the following subgeneric formula:

E) 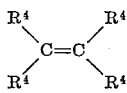

wherein $R^4$ is a halogen atom. As examples of the tetrahalogenated ethylenes that can be copolymerized with bicycloheptadiene, tetrafluoroethylene, tetrachloroethylene, dichlorodifluoroethylene, fluorotrichloroethylene, and chlorotrifluoroethylene can be mentioned.

The amount of bicycloheptadiene which can be present in the charge can vary from about 5 to about 95 weight percent, based upon the total weight of comonomers. The polymerizable, ethylenically unsaturated compound to be copolymerized with bicycloheptadiene can be present in the charge in an amount varying from about 95 to about 5 weight percent, based upon the total weight of comonomers.

It is to be understood that the terms "comonomer" and "copolymer" are employed in a generic sense, for bicycloheptadiene can be copolymerized with more than one polymerizable, ethylenically unsaturated compound in the same reaction to produce polymers containing more than two polymerized monomers, such as terpolymers, tetrapolymers, and the like.

As previously indicated, the polymerization is carried out in contact with a free-radical catalyst. By "free-radical catalyst" is meant a catalyst capable of producing a free radical under the polymerization conditions, such as one having an —O—O— or —N=N— linkage, or the trialkyl boron compounds in the presence of oxygen. The free-radical catalysts are known to the ordinary chemist skilled in the art, and include oxygen; hydrogen peroxide; alkyl and aryl peroxides, such as dimethyl peroxide, diethyl peroxide, dipropyl peroxide, di-tert-butyl peroxide, tert-butyl hydroperoxide, propyl methyl peroxide, and the like; acyl and aroyl peroxides, such as dibenzoyl peroxide, diacetyl peroxide, dilauroyl peroxide, perbenzoic acid, peracetic acid, perlauric acid, and the like; alkali metal persulfates, perborates and percarbonates; isopropylperoxydicarbonate; azo compounds, such as azo-bis-isobutyronitrile, dimethyl azodiisobutyrate, azo-bis-1-phenylethane, and the like; the alkali metal azodisulfonates; and trialkyl boron compounds, such as tri-n-butyl boron, and the like in the presence of oxygen.

In general, the concentration of free-radical catalysts in the charge can vary from about 0.001 to about 5 percent by weight of the total weight of the comonomers charged. It is preferred, however, to employ from about 0.01 to about 1.5 weight percent of the free-radical catalyst, based on the weight of the comonomers.

The copolymerization of bicycloheptadiene with the polymerizable, ethylenically unsaturated compound can be conducted either batch-wise or continuously, in autoclaves, tubular reactors, and the like. The copolymerization can be conducted according to known polymerization techniques, such as by bulk, suspension, emulsion, and solution processes. Preferred processes are the bulk and solution processes. Suitable diluents for such processes are normally liquid organic compounds that are inert under reaction conditions, such as benzene, toluene, hexane, isooctane, cyclohexane, acetone, methyl, ethyl ketone, and the like, or mixtures thereof. When diluents are employed they can be present in an amount up to about 95 weight percent or more, based upon the total weight of the comonomers.

The copolymerization is conducted at or above the activation temperature of the catalyst employed. For example, when dibenzoyl peroxide is employed as the catalyst, temperatures of 70° C. or higher are usually employed, while temperatures as low as 0° C. can be used when tributyl boron and oxygen is the catalyst. In general, temperatures of from about —250° C. to about 200° C. or higher are employed to produce the copolymers of this invention, with temperatures of from 25° C. to 75° C. preferred.

The copolymerization is generally conducted at autogenous pressures. Higher and lower pressures can be employed although they afford no particular advantages.

The copolymers of this invention are recovered according to known procedures. When the copolymer is insoluble in the reaction mixture it is recovered by conventional processes, such as filtration, centrifugation, and the like. When the copolymer is soluble in the reaction mixture it is recovered by evaporation or distillation of of the reaction medium or by solvent extraction procedures; for example by pouring the reaction mixture into a lower aliphatic alcohol, such as methanol, ethanol, and the like, whereby the copolymer is precipitated and then is filtered from the alcoholic slurry.

The bicycloheptadiene copolymers of this invention are high molecular weight solids in which essentially all the polymerized bicycloheptadiene is present in the nortricyclene form. These copolymers have reduced viscosities of from about 0.05 to about 3.0 or more, as determined at 30° C. from a solution containing 0.2 gram of of copolymer in 100 milliliters of the selected solvent, for example, cyclohexanone, benzene, or N,N-dimethylformamide.

The following examples are illustrative:

EXAMPLE I

*Bicyclo[2.2.1]hepta-2,5-diene/vinyl chloride copolymer*

Each of three, crown-caped, 300-milliliter bottles was charged with 50 grams of benzene, 5 grams of bicyclo[2.2.1]heta-2,5-diene, 45 grams of vinyl chloride, and 0.5 gram of tri-n-butylboron. Air was then passed through the bottles, after which they were capped and placed in a water-glycol bath maintained at 25° C. and rotated for 18 hours. The resulting reaction mixtures were combined, poured into methanol, and a copolymer of bicyclo[2.2.1]hepta-2,5-diene and vinyl chloride precipitated. The copolymer was filtered from the methanolic mixture, slurried in fresh methanol, refiltered, and dried. The yield was 13.6 grams of copolymer, which contained 85.6 weight percent of polymerized vinyl chloride, as determined by chlorine analysis. The bicyclo[2.2.1]hepta-2,5-diene/vinyl chloride copolymer had a reduced viscosity of 0.45 as determined from a solution of 0.2 gram of the copolymer in 100 milliliters of cyclohexanone at 30° C. The glass transition point of the copolymer was 94° C. as determined by temperature-stiffness measurements.

EXAMPLE II

*Bicyclo[2.2.1]hepta-2,5-diene/vinyl chloride copolymers*

A crown-capped, 300-milliliter bottle was charged with 18 grams of bicyclo[2.2.1]hepta-2,5-diene, 2 grams of vinyl chloride, 25 milliliters of toluene, and 0.2 gram of azo-bis-isobutyronitrile. The bottle was then capped and placed in a glycol-water bath maintained at 50° C. and rotated for 20 hours. The bottle was then removed from the bath and cooled to room temperature. The reaction mixture was then poured into twice its volume of methanol and a solid copolymer of vinyl chloride and bicyclo-[2.2.1]hepta-2,5-diene precipitated. After filtering from the methanol, washing with methanol, and vacuum drying, the copolymer weighed 0.5 gram. Chlorine analysis indicated that the copolymer contained 18.5 weight percent of polymerized vinyl chloride and 81.5 weight percent of polymerized bicyclo[2.2.1]hepta-2,5-diene.

Employing procedures similar to that described above, additional bicyclo[2.2.1]hepta - 2,5 - diene/vinyl chloride copolymers were produced. For convenience, the reaction conditions and results are set forth in Table A, with the data for Example I being included for ease in comparison. The reduced viscosities of all copolymers were determined from solutions of 0.2 gram of the copolymer in 100 milliliters of cyclohexanone at 300° C.

TABLE A

[Bicyclo[2.2.1]hepta-2,5-diene/vinyl chloride copolymers]

| Run No | 1 | 2 | 3 | 4 | 5 | 6 | Ex. I |
|---|---|---|---|---|---|---|---|
| Monomers: | | | | | | | |
| Vinyl chloride, grams | 2 | 4 | 8 | 12 | 16 | 18 | 135 |
| Bicyclo[2.2.1]hepta-2,5-diene, grams | 18 | 16 | 12 | 8 | 4 | 2 | 15 |
| Diluent: | | | | | | | |
| Benzene, grams | | | | | | | 150 |
| Toluene, milliliters | 25 | 25 | 25 | 25 | 25 | 25 | |
| Catalyst: | | | | | | | |
| Tri-n-butylboron, grams | | | | | | | 1.5 |
| Azo-bis-isobutyronitrile, grams | 0.2 | 0.2 | 0.2 | 0.2 | 0.2 | 0.2 | |
| Polymerization conditions: | | | | | | | |
| Time, hours | 20 | 20 | 20 | 7 | 7 | 7 | 18 |
| Temperature, ° C | 50 | 50 | 50 | 50 | 50 | 50 | 25 |
| Product: | | | | | | | |
| Weight, grams | 0.50 | 0.78 | 1.96 | 0.90 | 1.50 | 2.21 | 13.6 |
| Reduced viscosity | | | 0.27 | 0.36 | 0.40 | 0.48 | 0.45 |
| Vinyl chloride in copolymer, weight percent | 18.5 | 29.2 | 48.6 | 60.6 | 76.8 | 87.2 | 85.6 |
| Bicyclo[2.2.1]hepta-2,5-diene in copolymer, weight percent | 81.5 | 70.8 | 51.4 | 39.4 | 23.2 | 12.8 | 14.4 |

EXAMPLE III

*Bicyclo[2.2.1]hepta-2,5-diene/vinylidene chloride copolymers*

Employing procedures similar to that described in Example II, solid copolymers of vinylidene chloride and bicyclo[2.2.1]hepta-2,5-diene were produced at 50° C., employing 25 milliliters of benzene as the diluent and 0.2 gram of azo-bis-isobutyronitrile as the catalyst. For convenience the reaction conditions and results are set forth in Table B. Reduced viscosities were determined from solutions of 0.2 gram of the copolymer in 100 milliliters of cyclohexanone.

TABLE B

[Bicyclo [2.2.1]hepta-2,5-diene-vinylidene chloride copolymers]

| Run No | 1 | 2 | 3 | 4 | 5 |
|---|---|---|---|---|---|
| Monomers: | | | | | |
| Vinylidene chloride, grams | 2 | 4 | 12 | 16 | 18 |
| Bicyclo[2.2.1]hepta-2,5-diene, grams | 18 | 16 | 8 | 4 | 2 |
| Polymerization conditions: | | | | | |
| Time, hours | 6 | 6 | 2 | 2 | 1 |
| Product: | | | | | |
| Weight, grams | 0.31 | 0.45 | 0.30 | 0.72 | 0.37 |
| Reduced viscosity | | | | 0.17 | |
| Vinylidene chloride in copolymer, weight percent | 33.9 | 50.6 | 78.3 | 87.9 | 91.3 |
| Bicyclo[2.2.1]hepta-2,5-diene in copolymer, weight percent | 66.1 | 49.4 | 21.7 | 12.1 | 8.7 |

EXAMPLE IV

*Bicyclo[2.2.1]hepta-2,5-diene/chlorotrifluoroethylene copolymers*

Employing procedures similar to that described in Example II, solid copolymers of chlorotrifluoroethylene and bicyclo[2.2.1]hepta-2,5-diene was produced at temperatures of 25° C. to 40° C., employing 20 milliliters of isooctane as the diluent and 0.25 gram of isopropylperoxydicarbonate as the catalyst, were produced by holding the reaction mixture at 25° C. for three days and then heating at 40° C. overnight. For convenience, the monomer charge and reaction results are set forth in Table C. Reduced viscosities were determined from solutions of 0.2 gram of the copolymer in 100 milliliters of cyclohexanone.

TABLE C

[Bicyclo[2.2.1]hepta-2,5-diene/chlorotrifluoroethylene copolymers]

| Run No | 1 | 2 | 3 |
|---|---|---|---|
| Monomers: | | | |
| Chlorotrifluoroethylene, grams | 18 | 16 | 8 |
| Bicyclo[2.2.1]hepta-2,5-diene grams | 2 | 4 | 12 |
| Product: | | | |
| Weight, grams | 3.2 | 7.5 | 10.2 |
| Reduced viscosity | 0.08 | 0.14 | 0.15 |
| Chlorotrifluoroethylene in copolymer, weight percent | 54.0 | 54.9 | 42.9 |
| Bicyclo[2.2.1]hepta-2,5-diene in copolymer, weight percent | 46.0 | 45.1 | 57.1 |

In a similar manner a solid copolymer of bicyclo[2.2.1]hepta-2,5-diene and tetrafluoroethylene is produced by substituting tetrafluoroethylene for chlorotrifluoroethylene.

EXAMPLE V

*Bicyclo[2.2.1]hepta-2,5-diene/vinyl acetate copolymers*

Employing procedures similar to that described in Example II, solid copolymers of vinyl acetate and bicyclo[2.2.1]hepta-2,5-diene were produced at 50° C. employing 25 milliliters of benzene as the diluent and 0.2 gram of azo-bis-isobutyronitrile as the catalyst. For convenience, the reaction conditions and results are set forth in Table D. Reduced viscosities were determined from solutions of 0.2 gram of the copolymer in 100 milliliters of benzene.

TABLE D

[Bicyclo[2.2.1]hepta-2,5-diene/vinyl acetate copolymers.]

| Run No | 1 | 2 | 3 |
|---|---|---|---|
| Monomers: | | | |
| Vinyl acetate, grams | 2 | 4 | 18 |
| Bicyclo[2.2.1]hepta-2,5-diene, grams | 18 | 16 | 2 |
| Polymerization Conditions: Time, hours | 18 | 18 | 17 |
| Products: | | | |
| Weight, grams | 0.22 | 0.33 | 3.14 |
| Reduced viscosity | | | 0.44 |
| Vinyl acetate in copolymer, weight percent | 13.7 | 23.1 | 93.7 |
| Bicyclo [2.2.1]hepta-2,5-diene in copolymer, weight percent | 86.3 | 76.9 | 6.3 |

EXAMPLE VI

*Bicyclo[2.2.1]hepta-2,5-diene/acrylonitrile copolymers*

Employing procedures similar to that described in Example II, solid copolymers of acrylonitrile and bicyclo[2.2.1]hepta-2,5-diene were produced at 50° C. in the absence of diluent and using 0.2 gram of azo-bis-isobutyronitrile as the catalyst. For convenience, the reaction conditions and results are set forth in Table E. Reduced viscosities were determined from solutions of 0.2 gram of the copolymer in 100 milliliters of N,N-dimethylformamide.

TABLE E
[Bicyclo[2.2.1]hepta-2,5-diene/acrylonitrile copolymers]

| Run No | 1 | 2 | 3 | 4 |
|---|---|---|---|---|
| Monomers: | | | | |
| Acrylonitrile, grams | 4 | 12 | 16 | 18 |
| Bicyclo[2.2.1]hepta-2,5-diene, grams | 16 | 8 | 4 | 2 |
| Polymerization Conditions: Time, hours | 17 | 2 | 2 | 2 |
| Product: | | | | |
| Weight, grams | 1.98 | 0.44 | 0.72 | 1.22 |
| Reduced viscosity | 0.52 | | | |
| Acrylonitrile in copolymer, weight percent | 49.2 | 61.2 | 72.5 | 86.9 |
| Bicyclo[2.2.1]hepta-2,5-diene in copolymer, weight percent | 50.8 | 38.8 | 27.5 | 13.1 |

In a similar manner a solid copolymer of bicyclo[2.2.1]hepta-2,5-diene and methacrylonitrile is produced by subsituting methacrylonitrile for acrylonitrile.

EXAMPLE VII

*Bicyclo[2.2.1]hepta-2,5-diene/methyl methacrylate copolymers*

Employing procedures similar to that described in Example II, solid copolymers of methyl methacrylate and bicyclo[2.2.1]hepta-2,5-diene were produced at 50° C., employing 25 milliliters of benzene as the diluent and 0.2 gram of azo-bis-isobutyronitrile as the catalyst. For convenience the reaction conditions and results are set forth in Table F. Reduced viscosities were determined from solutions of 0.2 gram of the copolymer in 100 milliliters of benzene.

TABLE F
[Bicyclo[2.2.1]hepta-2,5-diene/methyl methacrylate copolymers]

| Run No | 1 | 2 |
|---|---|---|
| Monomers: | | |
| Methyl methacrylate, grams | 4 | 8 |
| Bicyclo[2.2.1]hepta-2,5-diene, grams | 16 | 12 |
| Polymerization Conditions: Time, hours | 17 | 2.5 |
| Products: | | |
| Weight, grams | 0.86 | 1.36 |
| Reduced viscosity | 0.18 | 0.35 |
| Methyl methacrylate in copolymer, weight percent | 92.8 | 95.4 |
| Bicyclo[2.2.1]hepta-2,5-diene in copolymer, weight percent | 7.2 | 4.6 |

EXAMPLE VIII

*Bicyclo[2.2.1]hepta-2,5-diene/ethyl acrylate copolymers*

Employing procedures similar to that described in Example II, solid copolymers of ethyl acrylate and bicyclo[2.2.1]hepta-2,5-diene were produced at 50° C., employing 25 milliliters of benzene as the diluent and 0.2 gram of azo-bis-isobutyronitrile as the catalyst. For convenience the reaction conditions and results are set forth in Table G. Reduced viscosities were determined from solutions of 0.2 gram of copolymer in 100 milliliters of benzene.

TABLE G
[Bicyclo[2.2.1]hepta-2,5-diene/ethyl acrylate copolymers]

| Run No | 1 | 2 | 3 | 4 | 5 | 6 |
|---|---|---|---|---|---|---|
| Monomers: | | | | | | |
| Ethyl acrylate, grams | 2 | 4 | 8 | 12 | 16 | 18 |
| Bicyclo[2.2.1]hepta-2,5-diene, grams | 18 | 16 | 12 | 8 | 4 | 2 |
| Polymerization Conditions: Time, hours | 2.0 | 2.0 | 0.75 | 0.50 | 0.33 | 0.33 |
| Product: | | | | | | |
| Weight, grams | 0.40 | 1.44 | 1.05 | 1.62 | 1.40 | 0.70 |
| Reduced viscosity | | 0.85 | | 2.24 | | |
| Ethyl acrylate in copolymer, weight percent | 57.0 | 64.0 | 75.3 | 84.8 | 91.2 | 95.9 |
| Bicyclo[2.2.1]hepta-2,5-diene in copolymer, weight percent | 43.0 | 36.0 | 24.7 | 15.2 | 8.8 | 4.1 |

EXAMPLE IX

*Bicyclo[2.2.1]hepta-2,5-diene/vinyl chloride/vinylidene chloride terpolymer*

A charge containing 163 grams of vinylidene chloride, 102 grams of bicyclo[2.2.1]hepta-2,5-diene, 960 grams of dry acetone and 81.7 milliliters of a 25% solution of diacetyl peroxide in dimethyl phthalate was placed in a 1.5-gallon, stirrer-equipped autoclave. The autoclave was purged with nitrogen for one minute, the reaction mixture was heated to 45° C., and 1789 grams of vinyl chloride were added. Then 14 grams of vinyl chloride were vented to leave 1775 grams of vinyl chloride in the autoclave. During the polymerization an additional 109.7 grams of vinylidene chloride were added in increments of about 4 grams each. The polymerization was conducted for 8 hours, after which time a conversion of comonomers to polymer of about 26.5% was achieved. The resulting reaction mixture was removed from the autoclave and poured into twice its volume of methanol, whereby a solid terpolymer of vinyl chloride, vinylidene chloride, and bicyclo[2.2.1]hepta-2,5-diene precipitated. The terpolymer, after filtering, washing with 2000 milliliters of methanol, and drying for 18 hours in a forced air oven at 55° C., weighed 570 grams. By microanalysis and infrared analysis the terpolymer was found to contain 72 weight percent polymerized vinyl chloride, 23.5 weight percent polymerized vinylidene chloride, and 4.5 weight percent polymerized bicyclo[2.2.1]hepta-2,5-diene. The reduced viscosity of the terpolymer was 0.38, as determined at 30° C. from a solution containing 0.2 gram of the terpolymer in 100 milliliters of cyclohexanone.

EXAMPLE X

*Bicyclo[2.2.1]hepta-2,5-diene/vinyl chloride diisobutyl fumarate terpolymer*

A charge containing 558 grams of vinyl chloride, 30 grams of diisobutyl fumarate, 12 grams of bicyclo[2.2.1]hepta-2,5-diene, 400 grams of dry acetone, and 6 grams of diacetyl peroxide was charged to a 1.5-gallon autoclave. The autoclave was sealed and heated to 45° C. After 1 hour at this temperature 45 grams of diisobutyl fumarate were added in increments of about 4.5 grams over a period of 10.2 hours. At the end of this time the reaction mixture was cooled, removed from the autoclave, and poured into twice its volume of methanol, whereby a solid terpolymer of bicyclo[2.2.1]hepta-2,5-diene, vinyl chloride, and diisobutyl fumarate precipitated. The terpolymer was filtered from the methanol, washed with additional methanol and dried for 16 hours in a forced-air oven at 55° C. The terpolymer weighed 181 grams, representing a yield of 28 percent.

Microanalysis and infrared analysis showed it to contain 69 weight percent polymerized vinyl chloride, 25 weight percent polymerized diisobutyl fumarate, and 6 weight percent polymerized bicyclo[2.2.1]hepta-2,5-diene. The terpolymer had a reduced viscosity of 0.43 as determined at 30° C. from a solution of 0.2 gram of the terpolymer in 100 milliliters of cyclohexanone.

The infrared spectra of the polymers produced in Examples I to X inclusive are all characterized by the presence of a very strong absorption band at 12.4μ and the essential absence of absorption bands due to unsaturation at 6.35μ and 14.1μ, indicating that essentially all of the bicycloheptadiene had polymerized as the nortricyclene group.

The copolymers of this invention can be employed as coating resins and can be formed into films and rods and the like. They are also useful to produce molded and extruded articles. The copolymers of this invention which have up to about 20 weight percent polymerized bicyclo[2.2.1]hepta-2,5-diene can be employed in many applications for which the homopolymers of the corresponding ethylenically unsaturated compounds are now employed.

The presence of the nortricyclene group in the copolymer gives it a higher softening or glass transition point than that of the homopolymer of the corresponding ethylenically unsaturated compound due to the greater rigidity of the nortricyclene group. Further, if the corresponding homopolymer has crystallinity, such as poly(vinyl chloride), the copolymer with bicycloheptadiene will have a lower "no strength temperature" or crystalline melting point due to the resulting irregularity of the copolymer and resulting disruption of polymer crystallinity.

In Table H the melting points and glass transition points of several of the copolymers of this invention are compared with the melting points and glass transition points of homopolymers of the corresponding ethylenically unsaturated compounds.

The glass transition point and crystalline melting point were estimated from a plot of the logarithm of stiffness modulus against temperature. Where the copolymer has crystallinity, the resulting curve can be thought of as comprising 4 sections. As the temperature increases from room temperature the curve comprises a first portion of slight negative slope, a second portion having a steep negative slope, a third portion of relatively less negative slope, and a fourth portion of relatively steep negative slope to a stiffness modulus of about zero. The temperature at which the point of inflection of the second portion of the curve occurs is referred to as the glass transition temperature and the temperature at which the stiffness modulus is about 0 is referred to as the crystalline melting point or "no strength temperature." Where the copolymer is amorphous, however, the curve has only the first two portions indicated above.

TABLE H

| Polymer | Bicyclo-heptadiene in Polymer, weight Percent | Glass Transition Point, °C. | Crystalline Melting Point, °C. |
| --- | --- | --- | --- |
| (a) Poly(vinyl chloride) | 0 | 78 | 250 |
| (b) Bicycloheptadiene/vinyl chloride [1] | 13.0 | 99 | 160 |
| (a) Poly(vinyl acetate) | 0 | 33 | |
| (b) Bicycloheptadiene/vinyl acetate [2] | 4.5 | 51 | |
| (a) Vinyl chloride/vinylidene chloride (74%/26%) | 0 | 58 | |
| (b) Bicycloheptadiene/vinyl chloride/vinylidene chloride (72%/23.5%/4.5%) [3] | 4.5 | 66 | |
| Bicyclo[2.2.1]hepta-2,5-diene | 100 | >200 | |

[1] Copolymer produced according to the process disclosed in Example II.
[2] Copolymer produced according to the process disclosed in Example V.
[3] Terpolymer produced according to Example IX.

From Table H it can be seen that the copolymerization of bicycloheptadiene with vinyl chloride results in a vinyl chloride-containing polymer which is melt-fabricatable even though it has a higher softening point than conventional poly(vinyl chloride), a result heretofore unattainable with poly(vinyl chloride).

The interpolymerization of bicycloheptadiene with vinyl acetate or with a vinyl chloride/vinylidene chloride mixture also resulted in higher softening points than those of the corresponding poly(vinyl acetate) or poly(vinyl chloride/vinylidene chloride). Since these latter polymers are amorphous no crystalline melting points were observed.

What is claimed is:

1. A normally solid copolymer of bicyclo[2.2.1]hepta-2,5-diene and at least one polymerizable, ethylenically unsaturated compound represented by the formula:

wherein X is a member selected from the group consisting of a hydrogen atom and a halogen atom; $X^1$ is a member selected from the group consisting of a hydrogen atom, a halogen atom, and a carbalkoxy radical having from 1 to 5 carbon atoms in the alkoxy radical thereof; $X^2$ is a member selected from the group consisting of a hydrogen atom, a halogen atom, a methyl radical, and a cyano radical; and $X^3$ is a member selected from the group consisting of a halogen atom, a carbalkoxy radical having from 1 to 5 carbon atoms in the alkoxy radical thereof, a saturated aliphatic acyloxy radical having from 1 to 5 carbon atoms in the alkyl radical thereof, and a cyano radical, the infrared transmission spectrum of said copolymer being characterized by the presence of an absorption band at 12.4μ and the essential absence of absorption bands due to olefinic unsaturation at 6.35μ and 14.1μ.

2. A normally-solid copolymer of bicyclo[2.2.1]hepta-2,5-diene and a vinylene-type compound represented by the formula:

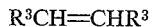

wherein each $R^3$ is a carbalkoxy radical having from 1 to 5 carbon atoms in the alkoxy radical thereof, the infrared transmission spectrum of said copolymer being characterized by the presence of an absorption band at 12.4μ and the essential absence of absorption bands due to olefinic unsaturation at 6.35μ and 14.1μ.

3. A normally solid copolymer of bicyclo[2.2.1]hepta-2,5-diene and a tetrahalogenated ethylene represented by the formula:

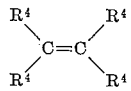

wherein each $R^4$ is a halogen atom, the infrared transmission spectrum of said copolymer being characterized by the presence of an absorption band at 12.4μ and the essential absence of absorption bands due to olefinic unsaturation at 6.35μ and 14.1μ.

4. A normally solid copolymer of bicyclo[2.2.1]hepta-2,5-diene and a vinyl compound represented by the formula:

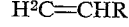

wherein R is a member selected from the group consisting of a halogen atom, a carbalkoxy radical having from 1 to 5 carbons in the alkoxy radical thereof, a saturated aliphatic acyloxy radical having from 1 to 5 carbon atoms in the alkyl radical thereof, and a cyano radical, the infrared transmission spectrum of said copolymer being characterized by the presence of an absorption band at 12.4μ and the essential absence of absorption bands due to olefinic unsaturation at 6.35μ and 14.1μ.

5. A normally solid copolymer of bicyclo[2.2.1]hepta-2,5-diene and a vinylidene-type compound represented by the formula:

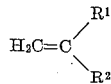

wherein $R^1$ is a member selected from the group consisting of a halogen atom, a cyano radical, and a methyl radical; and $R^2$ is a member selected from the group consisting of a halogen atom, a cyano radical, and a carbalkoxy radical having from 1 to 5 carbon atoms in the alkoxy radical thereof, the infrared transmission spectrum of said copolymer being characterized by the presence of an absorption band at 12.4μ and the essential absence of absorption bands due to olefinic unsaturation at 6.35μ and 14.1μ.

6. A normally solid terpolymer of bicyclo[2.2.1]-hepta-2,5-diene, vinyl chloride, and vinylidene chloride, the infrared transmission spectrum of said terpolymer being characterized by the presence of an absorption band at 12.4μ and the essential absence of absorption bands due to olefinic unsaturation at 6.35μ and 14.1μ.

7. A normally solid terpolymer of bicyclo[2.2.1]-hepta-2,5-diene, vinyl chloride, and diisopropyl fumarate the infrared transmission spectrum spectrum of said terpolymer being characterized by the presence of an absorption band at 12.4μ and the essential absence of absorption bands due to olefinic unsaturation at 6.35μ and 14.1μ.

8. A normally solid copolymer of bicyclo[2.2.1]-hepta-2,5-diene and vinyl chloride, the infrared transmission spectrum of said copolymer being characterized by the presence of an absorption band at 12.4μ and the essential absence of absorption bands due to olefinic unsaturation at 6.35μ and 14.1μ.

9. A normally solid copolymer of bicyclo[2.2.1]-hepta-2,5-diene and ethyl acrylate, the infrared transmission spectrum of said copolymer being characterized by the presence of an absorption band at 12.4μ and the essential absence of absorption bands due to olefinic unsaturation at 6.35μ and 14.1μ.

10. A normally solid copolymer of bicyclo[2.2.1]-hepta-2,5-diene and vinyl acetate, the infrared transmission spectrum of said copolymer being characterized by the presence of an absorption band at 12.4μ and the essential absence of absorption bands due to olefinic unsaturation at 6.35μ and 14.1μ.

11. A normally solid copolymer of bicyclo[2.2.1]-hepta-2,5-diene and acrylonitrile, the infrared transmission spectrum of said copolymer being characterized by the presence of an absorption band at 12.4μ and the essential absence of absorption bands due to olefinic unsaturation at 6.35μ and 14.1μ.

12. A normally solid copolymer of bicyclo[2.2.1]-hepta-2,5-diene and vinylidene chloride, the infrared transmission spectrum of said copolymer being characterized by the presence of an absorption band at 12.4μ and the essential absence of absorption bands due to olefinic unsaturation at 6.35μ and 14.1μ.

13. A normally solid copolymer of bicyclo[2.2.1]-hepta-2,5-diene and methyl methacrylate, the infrared transmission spectrum of said copolymer being characterized by the presence of an absorption band at 12.4μ and the essential absence of absorption bands due to olefinic unsaturation at 6.35μ and 14.1μ.

14. A normally solid copolymer of bicyclo[2.2.1]-hepta-2,5-diene and chlorotrifluoroethylene, the infrared transmission spectrum of said copolymer being characterized by the presence of an absorption band at 12.4μ and the essential absence of absorption bands due to olefinic unsaturation at 6.35μ and 14.1μ.

15. A solid thermoplastic saturated copolymer, soluble in aromatic solvents, of bicyclo[2.2.1]-2,5-hepta-diene and a dissimilar monomer selected from the group consisting of acrylate esters, said copolymer consisting of (1) nortricyclene units and (2) units of said dissimilar monomer.

16. A process for producing a copolymer of bicyclo-[2.2.1]hepta-2,5-diene and at least one polymerizable, ethylenically unsaturated compound represented by the formula:

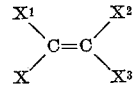

wherein X is a member selected from the group consisting of a hydrogen atom and a halogen atom; $X^1$ is a member selected from the group consisting of a hydrogen atom, a halogen atom, and a carbalkoxy radical having from 1 to 5 carbon atoms in the alkoxy radical thereof; $X^2$ is a member selected from the group consisting of a hydrogen atom, a halogen atom, a methyl radical, and a cyano radical; and $X^3$ is a member selected from the group consisting of a halogen atom, a carbalkoxy radical having from 1 to 5 carbon atoms in the alkyl radical thereof, a saturated aliphatic acyloxy radical having from 1 to 5 carbon atoms in the alkoxy radical thereof, and a cyano radical, the infrared transmission spectrum of said copolymer being characterized by the presence of an absorption band at 12.4μ and the essential absence of absorption bands due to olefinic unsaturation at 6.35μ and 14.1μ, which comprises contacting a mixture of said bicyclo[2.2.1]hepta-2,5-diene and said polymerizable ethylenically unsaturated compound with a free-radical catalyst at a temperature of from about 25° C. to about 200° C.

17. The process for producing a copolymer of bicyclo[2.2.1]hepta-2,5-diene and a vinylene-type compound represented by the formula:

$$R^3HC=CHR^3$$

wherein each $R^3$ is a carbalkoxy radical having from 1 to 5 carbon atoms in the alkoxy radical thereof, the infrared transmission spectrum of said copolymer being characterized by the presence of an absorption band at 12.4μ and the essential absence of absorption bands due to olefinic unsaturation at 6.35μ and 14.1μ, which comprises contacting said bicyclo[2.2.1]hepta-2,5-diene and said vinylene-type compound with a free-radical catalyst at a temperature of from 25° C. to 200° C.

18. The process for producing a copolymer of bicyclo-[2.2.1]hepta-2,5-diene and a vinyl compound represented by the formula:

$$H_2C=CHR$$

wherein R is a member selected from the group consisting of a halogen atom, a carbalkoxy radical having from 1 to 5 carbon atoms in the alkoxy radical thereof, a satuarated aliphatic acyloxy radical having from 1 to 5 carbon atoms in the alkyl group thereof, and a cyano radical, the infrared transmission spectrum of said copolymer being characterized by the presence of an absorption band at 12.4μ and the essential absence of absorption bands due to olefinic unsaturation at 6.35μ and 14.1μ, which comprises contacting said bicyclo[2.2.1]hepta-2,5-diene and said vinyl compound with a free radical catalyst at a temperature of from 25° C. to 200° C.

19. The process for producing a copolymer of bicyclo-[2.2.1]hepta-2,5-diene and a vinylidene-type compound represented by the formula:

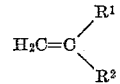

wherein $R^1$ is a member selected from the group consisting of a halogen atom, a cyano radical and a methyl radical; and $R^2$ is a member selected from the group consisting of a halogen atom, a cyano radical, and a carbalkoxy radical having from 1 to 5 carbon atoms in the alkyloxy radical thereof, the infrared transmission spectrum of said copolymer being characterized by the presence of an absorption band at 12.4μ and the essential absence of absorption bands due to olefinic unsaturation at 6.35μ and 14.1μ, which comprises contacting said bicyclo[2.2.1]-hepta-2,5-diene and said vinylidene-type compound with a free radical catalyst at a temperature of from 25° C. to 200° C.

20. The process for producing a copolymer of bicyclo-[2.2.1]hepta-2,5-diene and a tetrahalogenated ethylene represented by the formula:

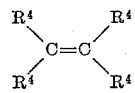

wherein each $R^4$ is a halogen atom, the infrared transmission spectrum of said copolymer being characterized by the presence of an absorption band at $12.4\mu$ and the essential absence of absorption bands due to olefinic unsaturation at $6.35\mu$ and $14.1\mu$, which comprises contacting said bicyclo[2.2.1]hepta-2,5-diene and said tetrahalogenated ethylene with a free-radical catalyst at a temperature of from 25° C. to 200° C.

21. The process for producing a terpolymer of bicyclo[2.2.1]hepta-2,5-diene, vinyl chloride, and vinylidene chloride, the infrared transmission spectrum of said terpolymer being characterized by the presence of an absorption band at $12.4\mu$ and the essential absence of absorption bands due to olefinic unsaturation at $6.35\mu$ and $14.1\mu$, which comprises contacting a mixture of bicyclo[2.2.1]hepta-2,5-diene, vinyl chloride, and vinylidene chloride with a free-radical catalyst at a temperature of from 25° C. to 200° C.

22. The process for producing a tempolymer of bicyclo[2.2.1]hepta-2,5-diene, vinyl chloride, and diisopropyl fumarate, the infrared transmission spectrum of said terpolymer being characterized by the presence of an absorption band at $12.4\mu$ and the essential absence of absorption bands due to olefinic unsaturation at $6.35\mu$ and $14.1\mu$, which comprises contacting a mixture of bicyclo[2.2.1]hepta-2,5-diene, vinyl chloride, and diisopropyl fumarate with a free-radical catalyst at a temperature of 25° C. to 200° C.

23. The process for producing a copolymer of bicyclo[2.2.1]hepta-2,5-diene and vinyl chloride, the infrared transmission spectrum of said copolymer being characterized by the presence of an absorpion band at $12.4\mu$ and the essential absence of absorption bands due to olefinic unsaturation at $6.35\mu$ and $14.1\mu$, which comprises contacting bicyclo[2.2.1]hepta-2,5-diene and vinyl chloride with a free-radical catalyst at a temperature of from 25° C. to 200° C.

24. The process for producing a copolymer of bicyclo[2.2.1]hepta-2,5-diene and ethyl acrylate, the infrared transmission spectrum of said copolymer being characterized by the presence of an absorption band at $12.4\mu$ and the essential absence of absorption bands due to olefinic unsaturation at $6.35\mu$ and $14.1\mu$, which comprises contacting bicyclo[2.2.1]hepta-2,5-diene and ethyl and acrylate with a free-radical catalyst at a temperature of from 25° C. to 200° C.

25. The process for producing a copolymer of bicyclo[2.2.1]hepta-2,5-diene and vinyl acetate, the infrared transmission spectrum of said copolymer being characterized by the presence of an absorption band at $12.4\mu$ and the essential absence of absorption bands due to olefinic unsaturation at $6.35\mu$ and $14.1\mu$, which comprises contacting bicyclo[2.2.1]hepta-2,5-diene and vinyl acetate with a free-radical catalyst at a temperature of from 25° C. to 200° C.

26. The process for producing a copolymer of bicyclo[2.2.1]hepta-2,5-diene and acrylonitrile, the infrared transmission spectrum of said copolymer being characterized by the presence of an absorption band at $12.4\mu$ and the essential absence of absorption bands due to olefinic unsaturation at $6.35\mu$ and $14.1\mu$, which comprises contacting bicyclo[2.2.1]hepta-2,5-diene and acrylonitrile with a free-radical catalyst at a temperature of from 25° C. to 200° C.

27. The process for producing a copolymer of bicyclo[2.2.1]hepta-2,5-diene and vinylidene chloride, the infrared transmission spectrum of said copolymer being characterized by the presence of an absorption band at $12.4\mu$ and the essential absence of absorption bands due to olefinic unsaturation at $6.35\mu$ and $14.1\mu$, which comprises contacting bicyclo[2.2.1]hepta-2,5-diene and vinylidene chloride with a free-radical catalyst at a temperature of from 25° C. to 200° C.

28. The process for producing a copolymer of bicyclo[2.2.1]hepta-2,5-diene and methyl methacrylate, the infrared transmission spectrum of said copolymer being characterized by the presence of an absorption band at $12.4\mu$ and the essential absence of absorption bands due to olefinic unsaturation at $6.35\mu$ and $14.1\mu$, which comprises contacting bicyclo[2.2.1]hepta-2,5-diene and methyl methacrylate with a free-radical catalyst at a temperature of from 25° C. to 200° C.

29. The process for producing a copolymer of bicyclo[2.2.1]hepta-2,5-diene and chlorotrifluoroethylene, the infrared transmission spectrum of said copolymer being characterized by the presence of an absorption band at $12.4\mu$ and the essential absence of absorption bands due to olefinic unsaturation at $6.35\mu$ and $14.1\mu$, which comprises contacting bicyclo[2.2.1]hepta-2,5-diene and chlorotrifluoroethylene with a free-radical catalyst at a temperature of from 25° C. to 200° C.

References Cited by the Examiner

UNITED STATES PATENTS

| | | | |
|---|---|---|---|
| 2,985,611 | 5/1961 | Gaylord et al. | 260—86.1 |
| 3,140,275 | 7/1964 | Spooncer | 260—86.7 |

FOREIGN PATENTS 701,211  12/1953  Great Britain.

OTHER REFERENCES

Kolesnikov: Chem. Abs., vol. 54, p. 24444f (1960).
Ullman: Chem. and Ind., p. 1173–4 (1958).

JOSEPH L. SCHOFER, *Primary Examiner.*

H. N. BURSTEIN, DONALD E. CZAJA, LEON J. BERCOVITZ, *Examiners.*

H. WONG, *Assistant Examiner.*